(12) United States Patent
Ishiguro (10) Patent No.: US 9,832,936 B2
(45) Date of Patent: Dec. 5, 2017

(54) ELECTRIC SCISSORS (71) Applicant: Max Co., Ltd., Tokyo (JP)

(72) Inventor: Hiroki Ishiguro, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 13/896,143

(22) Filed: May 16, 2013

(65) Prior Publication Data

US 2013/0247384 A1 Sep. 26, 2013

Related U.S. Application Data (63) Continuation of application No. 12/695,438, filed on Jan. 28, 2010, now abandoned.

(30) Foreign Application Priority Data

Jan. 30, 2009 (JP) .................................. 2009-020890

(51) Int. Cl.
*B26B 15/00* (2006.01)
*A01G 3/08* (2006.01)
*A01G 3/037* (2006.01)

(52) U.S. Cl.
CPC ............... *A01G 3/08* (2013.01); *A01G 3/037* (2013.01); *B26B 15/00* (2013.01)

(58) Field of Classification Search
CPC ............ B26B 15/00; A01G 3/08; A01G 3/085
(Continued)

(56) References Cited

U.S. PATENT DOCUMENTS

| | | | |
|---|---|---|---|
| 499,938 A | 6/1893 | Reynolds | |
| 728,068 A * | 5/1903 | Young | B26B 15/00 30/228 |

(Continued)

FOREIGN PATENT DOCUMENTS

| | | |
|---|---|---|
| CN | 2900106 Y | 5/2007 |
| DE | 88 02 877 U1 | 5/1988 |

(Continued)

OTHER PUBLICATIONS

Machinery's Handbook, 28th Edition. Copyright 2008, Industrial Press Inc., New York, NY.*

(Continued)

*Primary Examiner* — Kenneth E. Peterson
*Assistant Examiner* — Samuel A Davies
(74) *Attorney, Agent, or Firm* — Drinker Biddle & Reath LLP (57) ABSTRACT

Electric scissors (1A, 1B) is provided with: a first blade (2A, 2B); a second blade (3A, 3B); a toggle link mechanism (7A, 7B) including a first link (71A, 71B), a second link (72A, 72B), and a drive shaft (70A, 70B); and a drive section (5, 6). One end of the first link (71A, 71B) is rotatably connected to a transmission portion (21A, 21B) of the first blade (2A, 2B). One end of the second link (72A, 72B) is rotatably connected to a transmission portion (31A, 31B) of the second blade (3A, 3B). The other end of the first link (71A, 71B) is rotatably connected to the other end of the second link (72A, 72B) through the drive shaft (70A, 70B). The drive section (5, 6) is configured to open/close the first blade (2A, 2B) and the second blade (3A, 3B) by displacing the drive shaft (70A, 70B) in a direction perpendicular to an axial direction of the drive shaft (70A, 70B).

2 Claims, 3 Drawing Sheets (58) Field of Classification Search
USPC .......................................... 30/228, 251, 249
See application file for complete search history.

(56) References Cited

U.S. PATENT DOCUMENTS

| | | | |
|---|---|---|---|
| 914,731 A * | 3/1909 | Klitsch et al. | A41H 9/00 30/227 |
| 1,592,017 A | 7/1926 | Campen | |
| 2,490,086 A | 12/1949 | Page | |
| 3,178,816 A * | 4/1965 | Schmid | 30/228 |
| 3,535,783 A * | 10/1970 | Thatcher | A01G 3/033 251/114 |
| 3,666,975 A | 5/1972 | Balamuth | |
| 3,693,254 A | 9/1972 | Salonen | |
| 3,893,237 A | 7/1975 | Jahnke | |
| 4,080,733 A | 3/1978 | Clegg | |
| 4,376,340 A * | 3/1983 | Ramun et al. | 30/134 |
| 4,506,445 A | 3/1985 | Esten | |
| 4,838,493 A * | 6/1989 | LaBounty | B23D 35/001 225/103 |
| 5,002,135 A * | 3/1991 | Pellenc | A01G 3/037 173/170 |
| 5,142,779 A * | 9/1992 | LaBounty | B23D 17/00 144/24.12 |
| 5,243,761 A | 9/1993 | Sullivan et al. | |
| 5,272,811 A | 12/1993 | Armand | |
| 5,312,434 A | 5/1994 | Crainich | |
| 5,738,289 A | 4/1998 | Tagawa | |
| 5,875,554 A | 3/1999 | Vogelsanger | |
| 5,953,822 A * | 9/1999 | Vogelsanger | 30/228 |
| 6,044,564 A * | 4/2000 | Jeltsch | 30/228 |
| 6,971,179 B2 | 12/2005 | Erbrick | |
| 7,100,373 B2 | 9/2006 | Oide | |
| 7,284,720 B2 | 10/2007 | Ramun | |
| 7,331,109 B2 | 2/2008 | Tu | |
| 7,523,699 B2 * | 4/2009 | Sakamoto | B30B 1/00 100/281 |
| 2008/0289186 A1 * | 11/2008 | Adams | B23D 17/02 30/92 |
| 2009/0241351 A1 * | 10/2009 | Maniwa | B26B 15/00 30/228 |

FOREIGN PATENT DOCUMENTS

| | | | | |
|---|---|---|---|---|
| EP | 1 537 933 A1 | | 6/2005 | |
| EP | 2266388 | | 12/2010 | |
| FR | 2321839 | * | 3/1977 | ............... A01G 3/03 |
| JP | 62-74923 | | 5/1987 | |
| JP | 63-91315 | | 6/1988 | |
| JP | 08-163728 | | 6/1996 | |
| JP | 3027017 | | 7/1996 | |
| JP | 11-128561 | | 5/1999 | |
| JP | 2005-052384 A | | 3/2005 | |
| WO | WO 2008010476 A1 | * | 1/2008 | ............. A01G 3/037 |

OTHER PUBLICATIONS

Office Action (English translation) issued in Japanese Application No. 2009-020890 dated Feb. 6, 2013.

* cited by examiner

FIG.5

ELECTRIC SCISSORS

CROSS-REFERENCE TO RELATED APPLICATIONS

This application is a continuation of U.S. application Ser. No. 12/695,438 filed on Jan. 28, 2010, which is incorporated herein by reference in the entirety.

BACKGROUND OF THE INVENTION

Field of the Invention

The present invention relates to electric scissors, used to prune branches of trees or the like, for cutting objects to be cut, such as the branches, by opening and closing the blades using a drive power of a motor.

Background Art

Conventionally, branches or the like have been pruned with scissors by opening/closing blades of scissors with a hand of the user. However, for the purpose of saving labor of this work, electric scissors are proposed that can cut objects to be cut, such as the branches, by opening/closing the blades using a drive power of a motor.

Such electric scissors include a fixed blade and a movable blade being rotatable around a shaft serving as a fulcrum. A configuration referred to as a link type and a configuration referred to as a gear type are known as the configurations of systems for driving the movable blade.

Link-type electric scissors are configured so that the movable blade thereof is formed into an L-shape, for example, having a cutting edge portion on one side of the movable blade with respect to the shaft on which the movable blade is supported and having an arm portion on the other side of the movable blade. Furthermore, the electric scissors have a ball screw for converting a rotation of a motor into a linear motion of a nut portion and a link for connecting the nut portion to the arm portion of the movable blade. With this configuration, the linear movement of the nut portion is transmitted to the arm portion of the movable blade via the link, and the movable blade is rotated around the shaft serving as a fulcrum (for example, refer to Patent Document 1).

Patent Document 1: U.S. Pat. No. 5,002,135

Gear-type electric scissors are configured so that the movable blade thereof has an arc-shaped gear disposed coaxially with a shaft on which the movable blade is supported and so that the rotation of a motor is transmitted to the movable blade using a mechanism in which a bevel gear and a spur gear or the like are combined (for example, refer to Patent Document 2).

Patent Document 2: JP-A-11-128561

The link-type electric scissors are characterized in that as the blades are closed, the cutting torque thereof becomes low. Generally speaking, in the case of cutting an object to be cut with scissors, a large torque is not required at the beginning of the closing of the blades. However, a large torque is required as the blades are closed.

For this reason, for the purpose of obtaining a desired torque when the blades are closed, the link-type electric scissors are configured so that a large torque can be generated using a motor having a large output, for example. With this configuration, the large torque is applied at the beginning of the closing of the blades.

Hence, a load applied to the drive system, such as the ball screw mechanism, becomes large, and the durability of the drive system is degraded. On the other hand, for the purpose of improving the durability, the drive system is required to be constructed sturdily so as to cope with the large load. Consequently, although the electric scissors are used as a tool held in the hand, it is difficult to make the electric scissors light in weight, and the apparatus eventually becomes large in size and the operability thereof is degraded.

In the gear-type electric scissors, a constant torque is obtained regardless of the opening degree of the blades. However, the gears thereof are required to be increased in thickness to withstand the large load. It is thus difficult to make the electric scissors light in weight, and the apparatus eventually becomes large in size. On the other hand, if the gears are decreased in thickness to make the apparatus compact in size and light in weight, the durability thereof is degraded.

SUMMARY OF THE INVENTION

One or more embodiments of the invention provide electric scissors capable of obtaining a torque required for cutting an object to be cut without increasing a weight thereof.

In accordance with one or more embodiments of the invention, electric scissors (1A, 1B) are provided with: a first blade (2A, 2B) including a cutting edge portion (20A, 20B) and a transmission portion (21A, 21B), and rotatably supported by a shaft (4A, 4B) serving as a fulcrum; a second blade (3A, 3B) including a cutting edge portion (30A, 30B) and a transmission portion (31A, 31B), wherein an object between the first blade (2A, 2B) and the second blade (3A, 3B) is cut by closing the first blade (2A, 2B) and the second blade (3A, 3B); a toggle link mechanism (7A, 7B) including a first link (71A, 71B), a second link (72A, 72B), and a drive shaft (70A, 70B); and a drive section (5, 6). One end of the first link (71A, 71B) is rotatably connected to said transmission portion (21A, 21B) of the first blade (2A, 2B). One end of the second link (72A, 72B) is rotatably connected to said transmission portion (31A, 31B) of the second blade (3A, 3B). The other end of the first link (71A, 71B) is rotatably connected to the other end of the second link (72A, 72B) through the drive shaft (70A, 70B). The drive section (5, 6) is configured: to close the first blade (2A, 2B) and the second blade (3A, 3B) by displacing said drive shaft (70A, 70B) in a direction of increasing an angle between the first link (71A, 71B) and the second link (72A, 72B); and to open the first blade (2A, 2B) and the second blade (3A, 3B) by displacing said drive shaft (70A, 70B) in a direction of decreasing said angle between the first link (71A, 71B) and the second link (72A, 72B).

According to the electric scissors having the above structure, when the drive shaft is displaced in the direction of increasing the angle formed by the first link and the second link of the toggle link mechanism, the connection of the first link and the second link being bent at the drive shaft serving as a fulcrum, the first blade and the second blade are closed while being rotated around the shaft serving as a fulcrum. As the angle formed by the first link and the second link of the toggle link mechanism is increased and the first blade and the second blade are closed, a generated cutting force increases. As a result, a large cutting torque can be generated in the latter half of the closing operation of the first blade and the second blade.

According to the electric scissors having the above structure, since a large cutting torque can be generated in the latter half of the closing operation of the blades requiring a large torque to cut an object to be cut, such as a branch, the torque required to cut the object to be cut can be obtained without increasing the weight of the mechanisms of the electric scissors.

Hence, a load applied to the drive system of the electric scissors can be reduced, and the drive system can be made compact in size and light in weight without degrading durability. Since the drive system can be made compact in size and light in weight, the entire apparatus can also be made compact in size and light in weight. Consequently, the operability of the tool that is held in the hand and used can be improved.

Further, the second blade (3A) may be rotatably supported by said shaft (4A) serving as a fulcrum.

Said angle between the first link (71A, 71B) and the second link (72A, 72B) may become close to 180°, when the first blade (2A, 2B) and the second blade (3A, 3B) are closed to a maximum extent.

Moreover, the drive section may include a motor (5) to be rotatably driven, and a ball screw mechanism (6) configured to convert a rotation of the motor (5) into a linear motion and to transmit the linear motion to said drive shaft (70A, 70B) of said toggle link mechanism (7A, 7B).

Other aspects and advantages of the invention will be apparent from the following description, the drawings and the claims.

DETAILED DESCRIPTION OF THE EXEMPLARY EMBODIMENTS

Exemplary embodiments of electric scissors of the present invention will be described below referring to the accompanying drawings.

<A Configuration Example of Electric Scissors According to a First Exemplary Embodiment>

Figure 1:
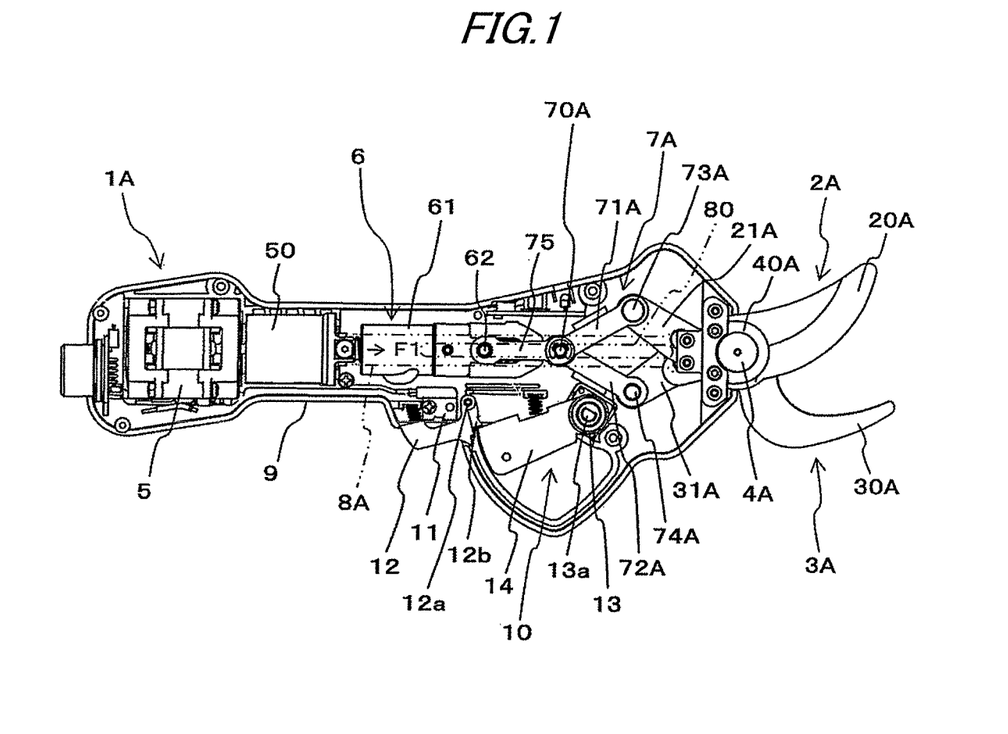
FIG. 1 is a side sectional view showing a configuration example of electric scissors according to a first exemplary embodiment.
Figure 2:
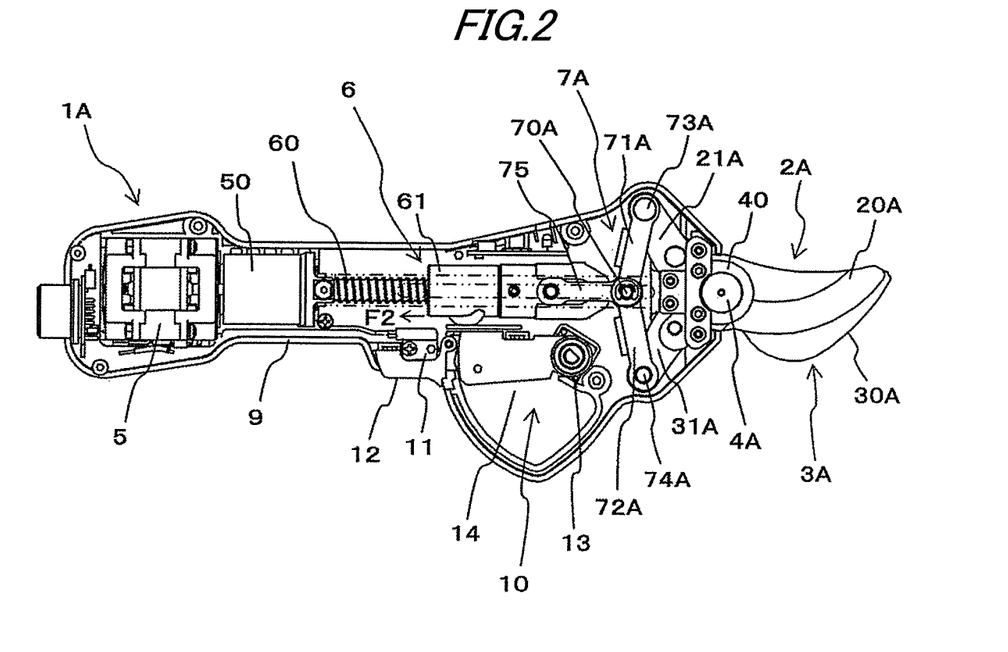
FIG. 2 is a side sectional view showing a configuration example of the electric scissors according to the first exemplary embodiment.

FIGS. 1 and 2 are side sectional views showing a configuration example of electric scissors according to a first exemplary embodiment. FIG. 1 shows a state in which the blades thereof are opened, and FIG. 2 shows a state in which the blades are closed.

In electric scissors 1A according to the first exemplary embodiment, a first movable blade 2A and a second movable blade 3A are rotatably supported by a shaft 4A serving as a fulcrum.

In the electric scissors 1A, the rotation of a motor 5 is converted into a linear motion using a ball screw mechanism 6, and the drive power of the motor 5, the rotation of which is converted into a linear motion, is transmitted to the first movable blade 2A and the second movable blade 3A using a toggle link mechanism 7A. As a result, the first movable blade 2A and the second movable blade 3A are rotated around the shaft 4A serving as a fulcrum, thereby being opened/closed.

In the electric scissors 1A, the shaft 4A is supported on a frame 8A, and the movements of the ball screw mechanism 6 and the toggle link mechanism 7A are guided along the frame 8A. Furthermore, in the electric scissors 1A, the above-mentioned respective components are installed in a housing 9, and the user can perform operation while holding the housing 9.

The respective components will be described below in detail. The first movable blade 2A, an example of a first blade, is equipped with a cutting edge portion 20A disposed on one side of the first movable blade 2A with respect to a position in which the first movable blade 2A is supported by the shaft 4A and is also equipped with a blade arm 21A disposed on the other side of the first movable blade 2A with respect to the position and serving as a transmission portion, the angle formed by the cutting edge portion 20A and the blade arm 21A being a predetermined obtuse angle. The cutting edge portion 20A and the blade arm 21A of the first movable blade 2A may be integrated into one component. However, it is preferable that the cutting edge portion 20A and the blade arm 21A should be independent components so that the cutting edge portion 20A can be replaced easily.

The second movable blade 3A, an example of a second blade, is equipped with a cutting edge portion 30A disposed on one side of the second movable blade 3A with respect to a position in which the second movable blade 3A is supported by the shaft 4A and is also equipped with a blade arm 31A disposed on the other side of the second movable blade 3A with respect to the position and serving as a transmission portion, the angle formed by the cutting edge portion 30A and the blade arm 31A being a predetermined obtuse angle. As in the case of the first movable blade 2A, the cutting edge portion 30A and the blade arm 31A of the second movable blade 3A may be integrated into one component. However, it is preferable that the cutting edge portion 30A and the blade arm 31A should be independent components so that the cutting edge portion 30A can be replaced easily.

The shaft 4A is installed in the frame 8A using a mounting fixture 40A while the cutting edge portion 20A of the first movable blade 2A and the cutting edge portion 30A of the second movable blade 3A are exposed from the housing 9. The first movable blade 2A and the second movable blade 3A are configured so that the cutting edge portions 20A and 30A can be replaced by attaching and detaching the mounting fixture 40A to and from the shaft 4A.

The motor 5 and the ball screw mechanism 6 constitute an example of a drive section, and the drive shaft of the motor 5 is connected to a speed reducer 50 having planet gears, for example. The ball screw mechanism 6 is equipped with a screw shaft 60 connected to the output shaft of the speed reducer 50 and a nut portion 61 in which balls, not shown, inserted in the screw groove of the screw shaft 60 are built in.

In the ball screw mechanism 6, a guide shaft 62 provided in the nut portion 61 is inserted into a guide groove 80 that is provided in the frame 8A in a direction in parallel with the screw shaft 60. When the screw shaft 60 of the ball screw mechanism 6 is driven and rotated, the rotation of the nut portion 61 around the screw shaft 60 serving as a fulcrum is restricted since the guide shaft 62 is guided along the guide groove 80, whereby the nut portion 61 is moved linearly along the screw shaft 60.

Hence, in the ball screw mechanism 6, the rotation of the motor 5 is converted into the linear motion of the nut portion 61. As a result, the movement direction of the nut portion 61 is switched depending on the rotation direction of the motor 5.

The toggle link mechanism 7A is equipped with a first link 71A and a second link 72A rotatably connected to each other via a drive shaft 70A. In the toggle link mechanism 7A, one end portion of the first link 71A is rotatably connected to the blade arm 21A of the first movable blade 2A via a shaft 73A serving as a fulcrum. In addition, one end portion of the second link, 72A is rotatably connected to the blade arm 31A of the second movable blade 3A via a shaft 74A serving as a fulcrum. Furthermore, the other end portion of the first link 71A is rotatably connected to the other end portion of the second link 72A via the drive shaft 70A serving as a fulcrum.

In the toggle link mechanism 7A, the connection portion of the blade arm 21A of the first movable blade 2A and the first link 71A at the shaft 73A is bent, and the connection portion of the blade arm 31A of the second movable blade 3A and the second link 72A at the shaft 74A is bent. Furthermore, the connection portion of the first link 71A and the second link 72A at the drive shaft 70A is bent.

The drive shaft 70A of the toggle link mechanism 7A is guided along the guide groove 80 of the frame 8A and supported so as to be movable in a direction in parallel with the screw shaft 60. The drive shaft 70A of the toggle link mechanism 7A is connected to the nut portion 61 via a transmission member 75 and is moved linearly in conjunction with the movement of the nut portion 61 obtained by the conversion of the rotation of the motor 5 into a linear motion using the ball screw mechanism 6.

The first movable blade 2A and the second movable blade 3A are rotated around the shaft 4A serving as a fulcrum, thereby being opened/closed. The blades are closed when the blade arm 21A of the first movable blade 2A and the blade arm 31A of the second movable blade 3A are rotated in directions in which the angle formed by the blade arm 21A and the blade arm 31A increases.

In the toggle link mechanism 7A, the connection portion of the first link 71A and the second link 72A at the drive shaft 70A is bent. In conjunction with the closing operation of the first movable blade 2A and the second movable blade 3A, the first link 71A and the second link 72A are rotated while the drive shaft 70A being moved linearly serves as a fulcrum in a direction of increasing the angle formed by the first link 71A and the second link 72A. Furthermore, the dimensions and angles of respective components are determined so that when the first movable blade 2A and the second movable blade 3A are closed, the angle formed by the first link 71A and the second link 72A becomes close to 180°. When the angle formed by the first link 71A and the second link 72A becomes larger than 180°, the first movable blade 2A and the second movable blade 3A are rotated in directions so that they are opened. Hence, the toggle link mechanism 7A is configured so that the angle formed by the first link 71A and the second link 72A does not become larger than 180°.

The electric scissors 1A are equipped with an operation section 10 for opening/closing the first movable blade 2A and the second movable blade 3A. The operation section 10 is equipped with an auxiliary trigger 12 that operates in conjunction with a first switch 11 for turning on/off the electric power supplied to the motor 5 and a main trigger 14 that operates in conjunction with a second switch 13 for controlling the rotation direction, the amount of rotation and the rotation speed of the motor 5.

The auxiliary trigger 12 is installed in the housing 9 so as to be rotatable around a shaft 12a serving as a fulcrum and is equipped with a restricting protrusion 12b for restricting the operation of the main trigger 14. The main trigger 14 is installed on the shaft 13a of the second switch 13. When the main trigger 14 is operated and the shaft 13a is rotated, the second switch 13 outputs control signals corresponding to the rotation direction, the amount of rotation and the rotation speed, whereby the motor 5 is controlled in accordance with the motion of the main trigger 14.

In the electric scissors 1A, when the auxiliary trigger 12 is not operated and the first switch 11 is in the ON state, the restricting protrusion 12b is locked with the main trigger 14, and the operation of the main trigger 14 is restricted.

When the auxiliary trigger 12 is operated so as to be displaced to a position where the first switch 11 is turned on, the power is turned on, and the restricting protrusion 12b is released from the main trigger 14. As a result, the operation of the main trigger 14 is made possible. Then, when the main trigger 14 is operated while the auxiliary trigger 12 has been operated, control signals corresponding to the rotation direction, the amount of rotation and the rotation speed of the main trigger 14 are output from the second switch 13, whereby the motor 5 is controlled in accordance with the motion of the main trigger 14.

<An Example of the Operation of the Electric Scissors According To the First Exemplary Embodiment>

Next, the operation of the electric scissors 1A according to the first exemplary embodiment will be described referring to the respective drawings. The user holds the housing 9 and operates the auxiliary trigger 12, thereby displacing the auxiliary trigger 12 to the position where the first switch 11 is turned on. As a result, the power of the electric scissors 1A is turned on, the restricting protrusion 12b is released from the main trigger 14, and the operation of the main trigger 14 is made possible.

The user operates the main trigger 14 while the auxiliary trigger 12 has been operated. In the electric scissors 1A, the control signals corresponding to the rotation direction, the amount of rotation and the rotation speed of the main trigger 14 are output from the second switch 13, whereby the motor 5 is controlled in accordance with the motion of the main trigger 14.

When the main trigger 14 of the electric scissors 1A is displaced in a direction of being pulled, the motor 5 is controlled so as to be rotated in a direction of closing the first movable blade 2A and the second movable blade 3A. When the main trigger 14 is displaced in a direction of being released, the motor 5 is controlled so as to be rotated in a direction of opening the first movable blade 2A and the second movable blade 3A.

When the motor 5 is driven and rotated in the direction of closing the first movable blade 2A and the second movable blade 3A, the nut portion 61 is moved linearly in the direction indicated by arrow F1 in accordance with the rotation direction of the screw shaft 60.

When the motor 5 is driven and rotated in a predetermined direction and the nut portion 61 is moved linearly in the direction indicated by arrow F1, the drive shaft 70A of the toggle link mechanism 7A connected to the nut portion 61 via the transmission member 75 is moved linearly in the direction indicated by arrow F1, that is, a direction of approaching the shaft 4A of the first movable blade 2A and the second movable blade 3A.

The displacement of the drive shaft 70A of the toggle link mechanism 7A due to the linear movement thereof is transmitted to the first movable blade 2A via the first link 71A and also transmitted to the second movable blade 3A via the second link 72A.

As shown in FIG. 1, when the drive shaft 70A of the toggle link mechanism 7A is moved linearly in the direction indicated by arrow F1 from a state in which the first movable blade 2A and the second movable blade 3A are opened, the first link 71A and the second link 72A, the connection portion therebetween being bent at the drive shaft 70A, are rotated in the direction of increasing the angle formed by the first link 71A and the second link 72A while the drive shaft 70A being moved linearly serves as a fulcrum.

The first movable blade 2A having the blade arm 21A connected to the first link 71A and the second movable blade 3A having the blade arm 31A connected to the second link 72A are rotated around the shaft 4A serving as a fulcrum in a direction of increasing the angle formed by the blade arm 21A and the blade arm 31A. When rotated in the direction of increasing the angle formed by the blade arm 21A and the blade arm 31A, the first movable blade 2A and the second movable blade 3A are closed.

Then, when the first movable blade 2A and the second movable blade 3A are closed, the angle formed by the first link 71A and the second link 72A becomes close to 180°. As the first movable blade 2A and the second movable blade 3A are closed, the angle formed by the first link 71A and the second link 72A of the toggle link mechanism 7A becomes close to 180°, whereby the first link 71A and the second link 72A approach a state of being aligned along a straight line.

With this configuration, the cutting force generated using the cutting edge portion 20A of the first movable blade 2A and the cutting edge portion 30A of the second movable blade 3A is increased in the state shown in FIG. 2 in which the first movable blade 2A and the second movable blade 3A are closed in comparison with the state shown in FIG. 1 in which the first movable blade 2A and the second movable blade 3A begin to be closed.

When the motor 5 is driven and rotated in the direction of opening the first movable blade 2A and the second movable blade 3A, the nut portion 61 is moved linearly in the direction indicated by arrow F2 in accordance with the rotation direction of the screw shaft 60.

When the motor 5 is driven and rotated in a direction opposite to the predetermined direction and the nut portion 61 is moved linearly in the direction indicated by arrow F2, the drive shaft 70A of the toggle link mechanism 7A is moved linearly in the direction indicated by arrow F2, that is, a direction of moving away from the shaft 4A of the first movable blade 2A and the second movable blade 3A.

As shown in FIG. 2, when the drive shaft 70A of the toggle link mechanism 7A is moved linearly in the direction indicated by arrow F2 from a state in which the first movable blade 2A and the second movable blade 3A are closed, the first link 71A and the second link 72A are rotated in a direction of decreasing the angle formed by the first link 71A and the second link 72A while the drive shaft 70A being moved linearly serves as a fulcrum.

The first movable blade 2A having the blade arm 21A connected to the first link 71A and the second movable blade 3A having the blade arm 31A connected to the second link 72A are rotated around the shaft 4A serving as a fulcrum in a direction of decreasing the angle formed by the blade arm 21A and the blade arm 31A. When rotated in the direction of decreasing the angle formed by the blade arm 21A and the blade arm 31A, the first movable blade 2A and the second movable blade 3A are opened.

Figure 3:
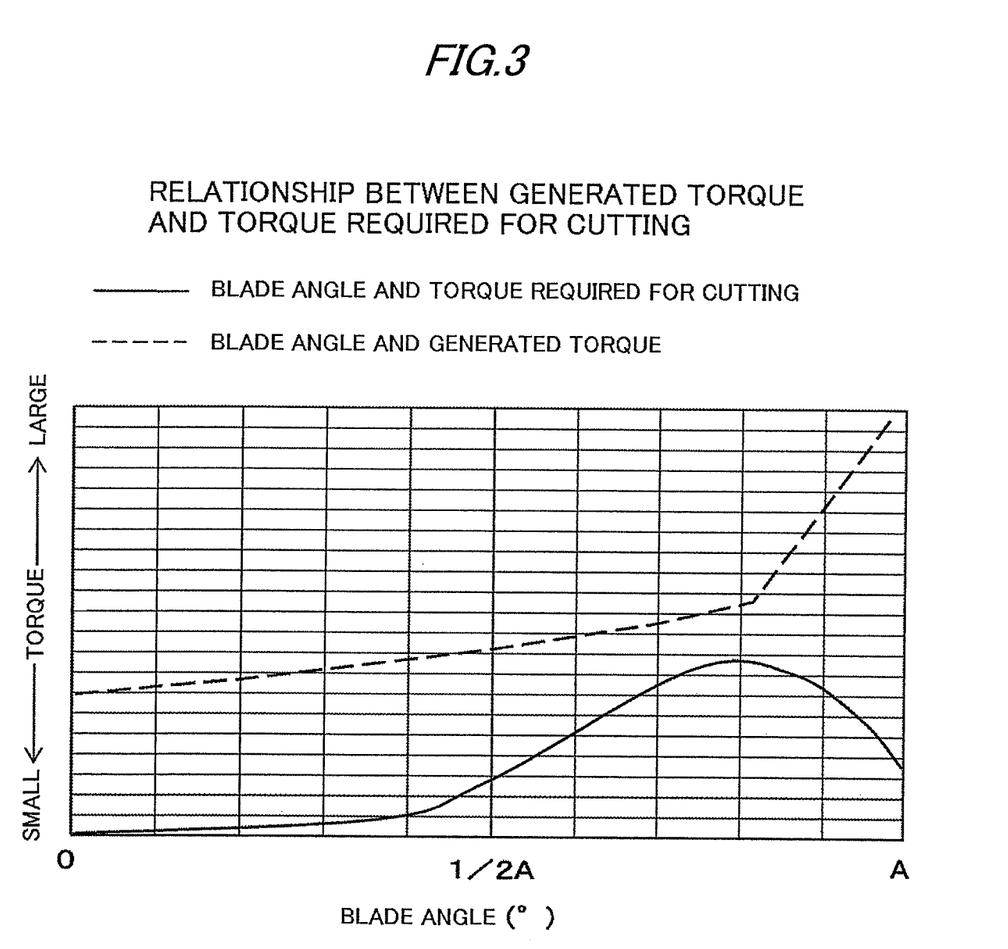
FIG. 3 is a graph showing a relationship between a generated torque and a torque required for cutting.

FIG. 3 is a graph showing the relationship between a generated torque and a torque required for cutting. In the electric scissors 1A shown in FIG. 1, etc., the relationship between a torque required for cutting a branch having a certain diameter and supposed to be cut using the electric scissors 1A and the angle formed by the first movable blade 2A and the second movable blade 3A is indicated using a solid line. In addition, the relationship between the angle formed by the first movable blade 2A and the second movable blade 3A and the generated torque is indicated using a broken line.

In FIG. 3, the vertical axis represents torque, and the horizontal axis represents blade angle. Blade angle=0(°) indicates a state in which the first movable blade 2A and the second movable blade 3A are opened as shown in FIG. 1, and blade angle A(°) indicates a state in which the first movable blade 2A and the second movable blade 3A are closed as shown in FIG. 2. Furthermore, blade angle ½A(°) indicates a state in which the first movable blade 2A and the second movable blade 3A are half opened.

Generally speaking, in the case of cutting a branch having a certain diameter, no large toque is required when the blades begin to be closed, but a large torque is required in a state in which the blades are closed approximately three-quarters of the entire blade angle. When it is assumed that the diameters of branches supposed to be cut using electric scissors are up to approximately 20 (mm), a similar tendency is observed regardless of the diameter.

On the other hand, in the case of the electric scissors 1A according to the first exemplary embodiment equipped with the toggle link mechanism 7A, it is found that the generated torque thereof is increased as the first movable blade 2A and the second movable blade 3A are closed, in comparison with the torque generated when the first movable blade 2A and the second movable blade 3A begin to be closed.

For this reason, the electric scissors 1A according to the first exemplary embodiment equipped with the toggle link mechanism 7A can generate a necessary and sufficient torque in the latter half closing operation of the first movable blade 2A and the second movable blade 3A requiring a large torque in the case of cutting a branch.

Since the necessary and sufficient torque for cutting a branch can be generated by using the toggle link mechanism 7A, the output of the motor 5 and the output of the ball screw mechanism 6 can be reduced in accordance with the torque actually required to cut the branch.

More specifically, in the case that the output of the drive section is the same as that in the conventional apparatus, a cutting force approximately two times the maximum load for cutting a branch can be attained by using the toggle link mechanism 7A. For this reason, even if the output of the motor 5 or the ball screw mechanism 6 is reduced to approximately half, it is possible to obtain a force capable of cutting the branch.

As a result, the outputs of the motor 5 and the ball screw mechanism 6 can be reduced, and the durability of the ball screw mechanism 6, etc. can be improved. In addition, the ball screw mechanism 6, etc. can be made compact by reducing the outputs of the motor 5 and the ball screw mechanism 6. In the case that the ball screw mechanism 6, etc. can be made compact in size, the housing 9 being held in the hand of the user can be designed narrow, and the operability of the apparatus can be improved. Furthermore, since the outputs of the motor 5 and the ball screw mechanism 6 can be reduced, the voltage of the battery for driving the motor 5 can be lowered. Consequently, the battery can be made compact in size and light in weight by reducing the number of cells in the battery, for example.

In the electric scissors 1A according to the first exemplary embodiment, both the first movable blade 2A and the second movable blade 3A are movable. The rotation angle of the blades when the blades are closed should only be half the rotation angle obtained in a configuration in which one of the blades is a movable blade and the other is a fixed blade, provided that the opening angle of the blades is the same. Hence, in the case that the movement amount of the nut portion per rotation of the screw shaft is the same and the output of the ball screw mechanism is also the same in both the single blade drive type and the double blade drive type, the stroke of the ball screw mechanism 6 in the double blade drive type can be made approximately half the stroke in the single blade drive type. Hence, the apparatus can be made compact in length.

<A Configuration Example of Electric Scissors According to a Second Exemplary Embodiment>

Figure 4:
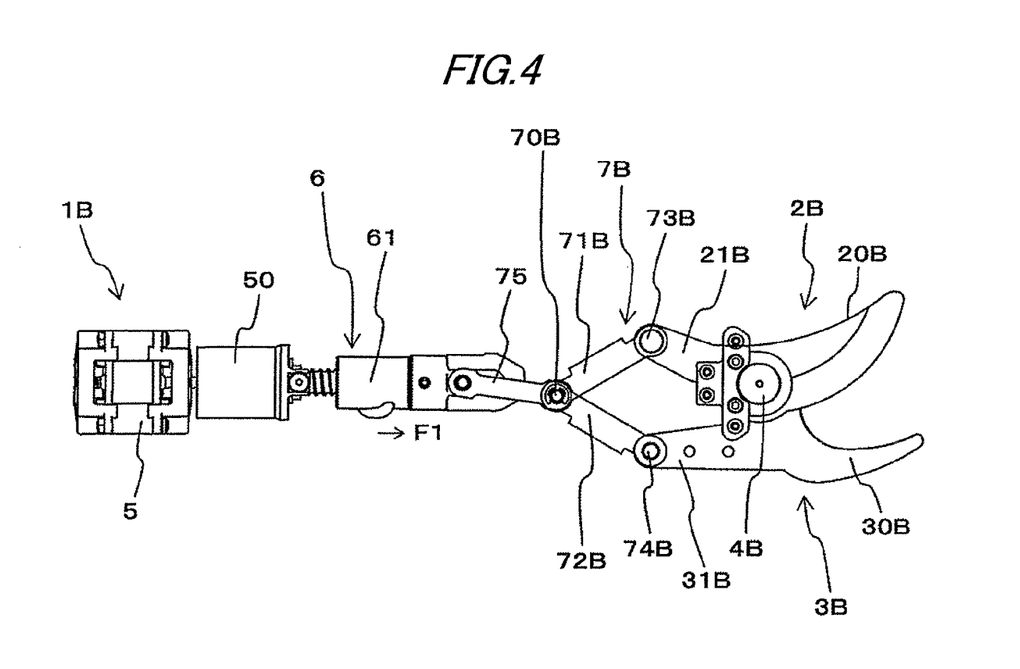
FIG. 4 is a side sectional view showing a configuration example of electric scissors according to a second exemplary embodiment.
Figure 5:
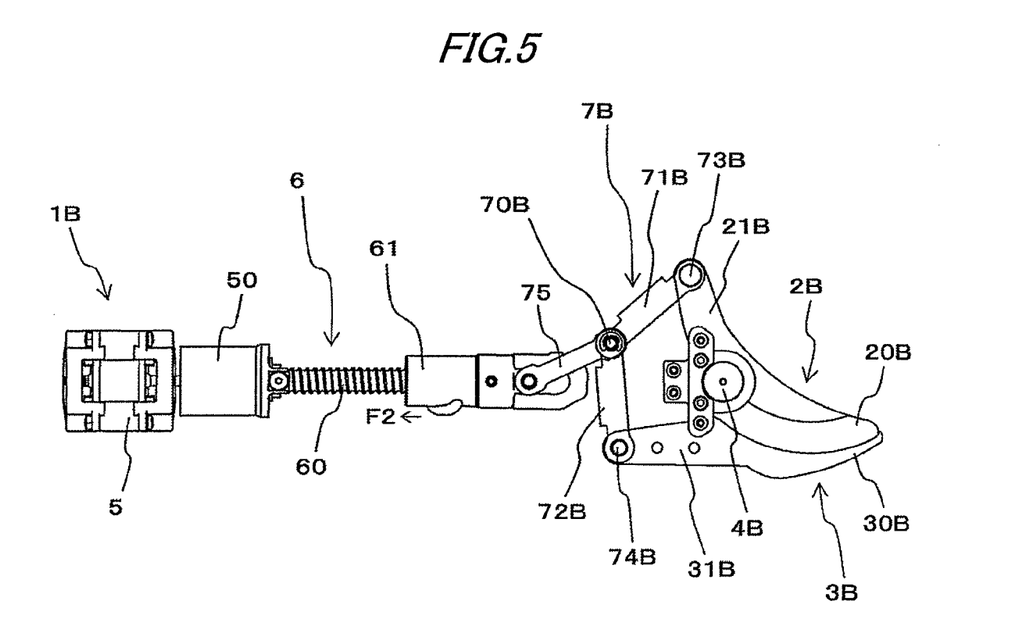
FIG. 5 is a side sectional view showing a configuration example of the electric scissors according to the second exemplary embodiment.

FIGS. 4 and 5 are side sectional views showing a configuration example of electric scissors according to a second exemplary embodiment; FIG. 4 shows a state in which the blades thereof are opened, and FIG. 5 shows a state in which the blades are closed. In FIGS. 4 and 5, mechanisms for driving one of the blades of the electric scissors are shown, and the housing, the operation section, etc. thereof are not shown.

Electric scissors 1B according to the second exemplary embodiment have a movable blade 2B and a fixed blade 3B, and the movable blade 2B is rotatably supported by a shaft 4B serving as a fulcrum.

In the electric scissors 1B, the rotation of a motor 5 is converted into a linear motion using a ball screw mechanism 6, and the drive power of the motor 5, the rotation of which is converted into a linear motion, is transmitted to the movable blade 2B using a toggle link mechanism 7B. As a result, the movable blade 2B is rotated around the shaft 4B serving as a fulcrum, thereby being opened/closed.

The respective components will be described below in detail. The movable blade 2B, an example of a first blade, is equipped with a cutting edge portion 20B disposed on one side of the movable blade 2B with respect to a position in which the movable blade 2B is supported by the shaft 4B and is also equipped with a blade arm 21A disposed on the other side of the movable blade 2B with respect to the position and serving as a transmission portion, the angle formed by the cutting edge portion 20B and the blade arm 21B being a predetermined obtuse angle. The cutting edge portion 20B and the blade arm 21B of the movable blade 2B may be integrated into one component or may be independent components.

The fixed blade 3B, an example of a second blade, is equipped with a cutting edge portion 30B and a blade arm 31B serving as a transmission portion. The cutting edge portion 30B and the blade arm 31B of the fixed blade 3B may be integrated into one component or may be independent components.

The drive shaft of the motor 5 is connected to a speed reducer 50 having planet gears, for example. The ball screw mechanism 6 is equipped with a screw shaft 60 connected to the output shaft of the speed reducer 50 and a nut portion 61 in which balls, not shown, inserted in the screw groove of the screw shaft 60 are built in. When the screw shaft 60 is driven and rotated, the nut portion 61 is moved linearly along the screw shaft 60.

In the ball screw mechanism 6, the rotation of the motor 5 is converted into the linear motion of the nut portion 61. As a result, the movement direction of the nut portion 61 is switched depending on the rotation direction of the motor 5.

The toggle link mechanism 7B is equipped with a first link 71B and a second link 72B rotatably connected to each other via a drive shaft 70B. In the toggle link mechanism 7B, one end portion of the first link 71B is rotatably connected to the blade arm 21B of the movable blade 2B via a shaft 73B serving as a fulcrum. In addition, one end portion of the second link 72B is rotatably connected to the blade arm 31B of the fixed blade 3B via a shaft 74B serving as a fulcrum. Furthermore, the other end portion of the first link 71B is rotatably connected to the other end portion of the second link 72B via the drive shaft 70B serving as a fulcrum.

The drive shaft 70B of the toggle link mechanism 7B is connected to the nut portion 61 via a transmission member 75 and is moved linearly in conjunction with the movement of the nut portion 61 obtained by the conversion of the rotation of the motor 5 into a linear motion using the ball screw mechanism 6.

The movable blade 2B is rotated around the shaft 43 serving as a fulcrum, thereby being opened/closed with respect to the fixed blade 3B. The blade is closed when the blade is rotated in a direction in which the angle formed by the blade arm 21B of the movable blade 2B and the blade arm 31B of the fixed blade 3B increases.

In the toggle link mechanism 7B, the connection portion of the first link 71B and the second link 72B at the drive shaft 70B is bent. In conjunction with the closing operation of the movable blade 2B, the first link 71B and the second link 72B are rotated while the drive shaft 70B being moved linearly serves as a fulcrum in a direction of increasing the angle formed by the first link 71B and the second link 72B. Furthermore, the dimensions and angles of respective components are determined so that when the movable blade 2B is closed, the angle formed by the first link 71B and the second link 72B becomes close to 180°.

<An Example of the Operation of the Electric Scissors According to the Second Exemplary Embodiment>

Next, the operation of the electric scissors 1B according to the second exemplary embodiment will be described referring to the respective drawings. When the motor 5 is driven and rotated in a direction of closing the movable blade 2B, the nut portion 61 is moved linearly in the direction indicated by arrow F1 in accordance with the rotation direction of the screw shaft 60.

When the motor 5 is driven and rotated in a predetermined direction and the nut portion 61 is moved linearly in the direction indicated by arrow F1, the drive shaft 70B of the toggle link mechanism 7B connected to the nut portion 61 via the transmission member 75 is moved linearly in a direction of approaching the shaft 4B of the movable blade 2B. The displacement of the drive shaft 70B of the toggle link mechanism 7B due to the linear movement thereof is transmitted to the movable blade 2B via the first link 71B.

As shown in FIG. 4, when the drive shaft 70B of the toggle link mechanism 7B is moved linearly from a state in which the movable blade 2B is opened, the first link 71B and the second link 72B, the connection portion therebetween being bent at the drive shaft 70B, are rotated in the direction of increasing the angle formed by the first link 71B and the second link 72B while the drive shaft 70B being moved linearly serves as a fulcrum.

The movable blade 2B having the blade arm 21B connected to the first link 71B is rotated around the shaft 4B serving as a fulcrum in a direction of increasing the angle formed by the blade arm 21B and the blade arm 31B. When rotated in the direction of increasing the angle formed by the blade arm 21B and the blade arm 31B, the movable blade 2B is closed with respect to the fixed blade 3B.

Then, when the movable blade 2B is closed, the angle formed by the first link 71B and the second link 72B becomes close to 180°. As the movable blade 2B is closed, the angle formed by the first link 71B and the second link 72B of the toggle link mechanism 7B becomes close to 180°, whereby the first link 71B and the second link 72B approach a state of being aligned along a straight line.

With this configuration, the cutting force generated using the cutting edge portion 20B of the movable blade 2B and the cutting edge portion 30B of the fixed blade 3B is increased in the state shown in FIG. 5 in which the movable blade 2B is closed in comparison with the state shown in FIG. 4 in which the movable blade 2B begins to be closed.

When the motor 5 is driven and rotated in the direction of opening the movable blade 2B, the nut portion 61 is moved linearly in the direction indicated by arrow F2 in accordance with the rotation direction of the screw shaft 60.

When the motor 5 is driven and rotated in a direction opposed to the predetermined direction and the nut portion 61 is moved linearly in the direction indicated by arrow F2, the drive shaft 70B of the toggle link mechanism 7B connected to the nut portion 61 via the transmission member 75 is moved linearly in a direction of moving away from the shaft 4B of the movable blade 2B.

As shown in FIG. 5, when the drive shaft 70B of the toggle link mechanism 7B is moved linearly from a state in which the movable blade 2B is closed, the first link 71B and the second link 72B, the connection portion therebetween being bent at the drive shaft 70B, are rotated in a direction of decreasing the angle formed by the first link 71B and the second link 72B while the drive shaft 70B being moved linearly serves as a fulcrum.

The movable blade 2B having the blade arm 21B connected to the first link 71B is rotated around the shaft 4B serving as a fulcrum in a direction of decreasing the angle formed by the blade arm 21B and the blade arm 31B. When rotated in the direction of decreasing the angle formed by the blade arm 21B and the blade arm 31B, the movable blade 2B is opened with respect to the fixed blade 3B.

While description has been made in connection with specific exemplary embodiments of the invention, it will be obvious to those skilled in the art that various changes and modification may be made therein without departing from the present invention.

For example, in the exemplary embodiments referred in the above, the motor 5 and the ball screw mechanism 6 are used as the drive section for displacing the drive shaft 70A, 70B in a linear direction perpendicular to an axial direction of the drive shaft 70A, 70B. However, as a structure for converting the rotational motion of the motor 5 to the linear motion, any well known structures other than the ball screw mechanism 6 can be used. Moreover, an electromagnetic solenoid actuator, a linear motor, or the like can be used as the drive section, instead of the combination of the motor 5 and the ball screw mechanism 6.

DESCRIPTION OF REFERENCE NUMERALS AND SIGNS 1A, 1B . . . electric scissors, 2A . . . first movable blade, 2B . . . movable blade, 3A . . . second movable blade, 3B . . . fixed blade, 4A, 4B . . . shaft, 5 . . . motor, 6 . . . ball screw mechanism, 7A, 7B . . . toggle link mechanism, 70A, 70B . . . drive shaft, 71A, 71B . . . first link, 72A, 72B . . . second link

What is claimed is:
1. Electric scissors comprising:
a first blade including a first cutting edge portion and a first transmission portion, and rotatably supported by a fulcrum shaft serving as a fulcrum;
wherein the first cutting edge portion is disposed on one side of the first blade with respect to a position in which the first blade is supported by the fulcrum shaft,
the first transmission portion is disposed on the other side of the first blade with respect to the position, and
an angle between the first cutting edge portion and the first transmission portion is a predetermined obtuse angle;
a second blade including a second cutting edge portion and a second transmission portion,
wherein the second cutting edge portion is disposed on one side of the second blade with respect to a position in which the second blade is fixed relative to the fulcrum shaft, and
the second transmission portion is disposed on the other side of the second blade with respect to the position;
a drive section including a nut portion configured to linearly move a transmission member, wherein one side of the transmission member is rotatably connected to a guide shaft provided in the nut portion;
a first link, wherein the first link is a separate member from the transmission member, one end portion of the first link is rotatably connected to the other end portion of the transmission member via a drive shaft, and the other end portion of the first link is rotatably connected to the first transmission portion via a first transmission shaft serving as a first transmission fulcrum for the first transmission portion; and
a second link, wherein the second link is a separate member from the transmission member, one end portion of the second link is rotatably connected to the other end portion of the transmission member via the drive shaft, and the other end portion of the second link is rotatably connected to the second transmission portion via a second transmission shaft serving as a second transmission fulcrum for the second transmission portion,
wherein the first cutting edge portion is configured to be closed relative to the second cutting edge portion by rotating, around the fulcrum shaft, in a direction in which an angle between the first transmission portion and the second transmission portion increases, and the first cutting edge portion is configured to be opened relative to the second cutting edge portion by rotating, around the fulcrum shaft, in the direction in which the angle between the first transmission portion and the second transmission portion decreases,
wherein the drive section includes a motor to be rotatably driven and a ball screw mechanism configured to convert a rotation of the motor into a linear motion and to transmit the linear motion to the drive shaft, the ball screw mechanism including a screw shaft and the nut portion configured to linearly move along the screw shaft by rotating the screw shaft, the drive shaft being connected to the nut portion via the transmission member,
wherein the fulcrum shaft is disposed on a longitudinal axis with the screw shaft in a longitudinal direction,
wherein the screw shaft and the nut portion are disposed on an opposite side of the drive shaft, which is connected to the other end portion of the transmission member, from the first link and the second link in the longitudinal direction at all times, and
wherein rotation of the transmission member around the guide shaft moves the drive shaft so as to be off of the longitudinal axis of the screw shaft of the ball screw mechanism when the first blade and the second blade are closed to a maximum extent.

2. The electric scissors according to claim 1, wherein said angle between the first link and the second link becomes close to 180 degrees, when the first blade and the second blade are closed to a maximum extent.

\* \* \* \* \*